(12) United States Patent
Walston et al.

(10) Patent No.: US 10,801,350 B2
(45) Date of Patent: Oct. 13, 2020

(54) ACTIVELY COOLED ENGINE ASSEMBLY WITH CERAMIC MATRIX COMPOSITE COMPONENTS

(71) Applicant: Rolls-Royce Corporation, Indianapolis, IN (US)

(72) Inventors: Jeffrey A. Walston, Indianapolis, IN (US); Daniel K. Vetters, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 331 days.

(21) Appl. No.: 15/903,836

(22) Filed: Feb. 23, 2018

(65) Prior Publication Data

US 2019/0264572 A1    Aug. 29, 2019

(51) Int. Cl.
*F01D 11/08* (2006.01)
*F01D 25/12* (2006.01)
*F01D 25/00* (2006.01)

(52) U.S. Cl.
CPC ............ *F01D 11/08* (2013.01); *F01D 25/005* (2013.01); *F01D 25/12* (2013.01); *F05D 2220/32* (2013.01); *F05D 2240/11* (2013.01); *F05D 2260/20* (2013.01); *F05D 2260/30* (2013.01); *F05D 2300/6033* (2013.01)

(58) Field of Classification Search
CPC .......... F01D 11/08; F01D 25/12; F01D 25/08; F01D 25/005
See application file for complete search history.

(56) References Cited

U.S. PATENT DOCUMENTS

| 7,044,709 | B2 * | 5/2006 | Bruce ................. F01D 9/04 415/135 |
| 7,722,317 | B2 | 5/2010 | Schiavo et al. |
| 9,175,571 | B2 * | 11/2015 | Floyd ................. F01D 5/284 |
| 9,598,975 | B2 | 3/2017 | Uskert et al. |
| 2004/0047726 | A1 | 3/2004 | Morrision |
| 2004/0062639 | A1 | 4/2004 | Glynn et al. |
| 2005/0129499 | A1 | 6/2005 | Morris et al. |
| 2007/0031258 | A1 | 2/2007 | Chien et al. |
| 2012/0260670 | A1 | 10/2012 | Foster et al. |
| 2014/0271147 | A1 | 9/2014 | Uskert et al. |
| 2016/0376921 | A1 * | 12/2016 | O'Leary ............ F01D 25/12 415/116 |
| 2017/0145845 | A1 | 5/2017 | Vetters et al. |
| 2017/0175572 | A1 | 6/2017 | Vetters |
| 2017/0321567 | A1 | 11/2017 | Vetters et al. |

FOREIGN PATENT DOCUMENTS

| EP | 1124039 | A1 | 8/2001 |
| EP | 2357322 | A2 | 8/2011 |
| EP | 2631434 | A2 | 8/2013 |
| EP | 3103963 | A1 | 12/2016 |
| EP | 3103964 | A1 | 12/2016 |
| EP | 3103971 | A1 | 12/2016 |
| EP | 3106620 | A1 | 12/2016 |
| EP | 3106630 | A1 | 12/2016 |
| EP | 3173583 | A1 | 5/2017 |
| WO | 2015191186 | A1 | 12/2015 |

* cited by examiner

*Primary Examiner* — Kenneth Bomberg
*Assistant Examiner* — Michael L Sehn
(74) *Attorney, Agent, or Firm* — Barnes & Thornburg LLP

(57) ABSTRACT

An actively cooled assembly adapted for use in a gas turbine engine is disclosed herein. In illustrative embodiments, the assembly includes at least one ceramic matrix composite component with an attachment feature.

20 Claims, 3 Drawing Sheets

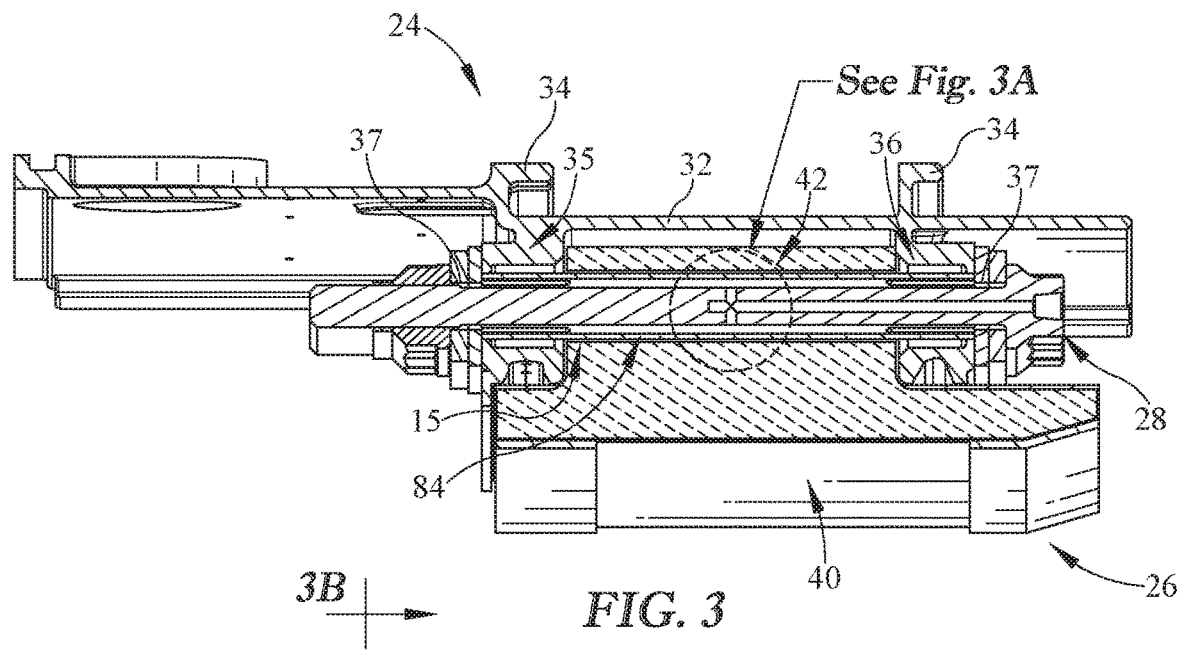
FIG. 3
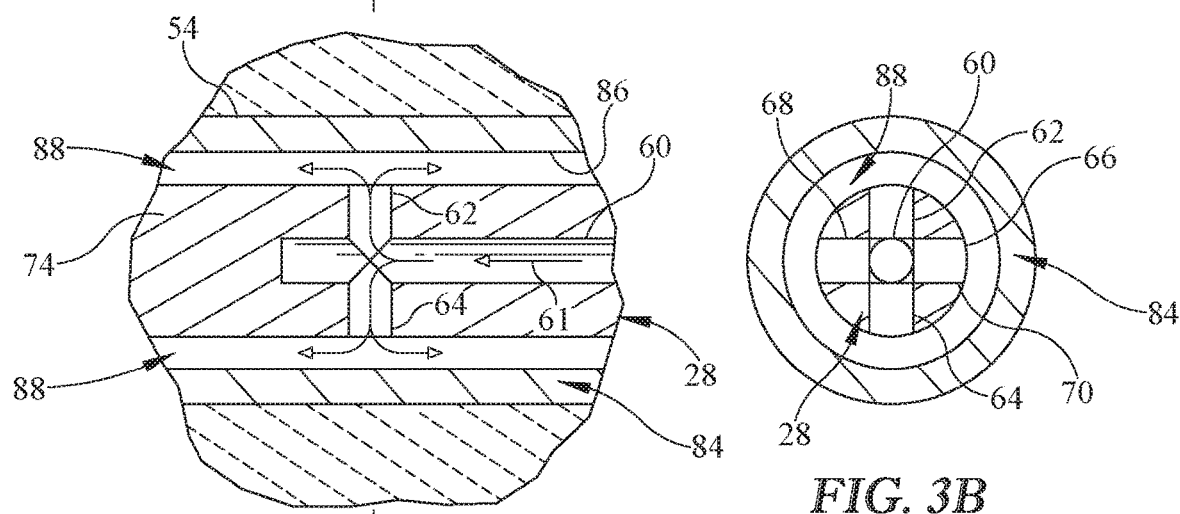
FIG. 3A
FIG. 3B
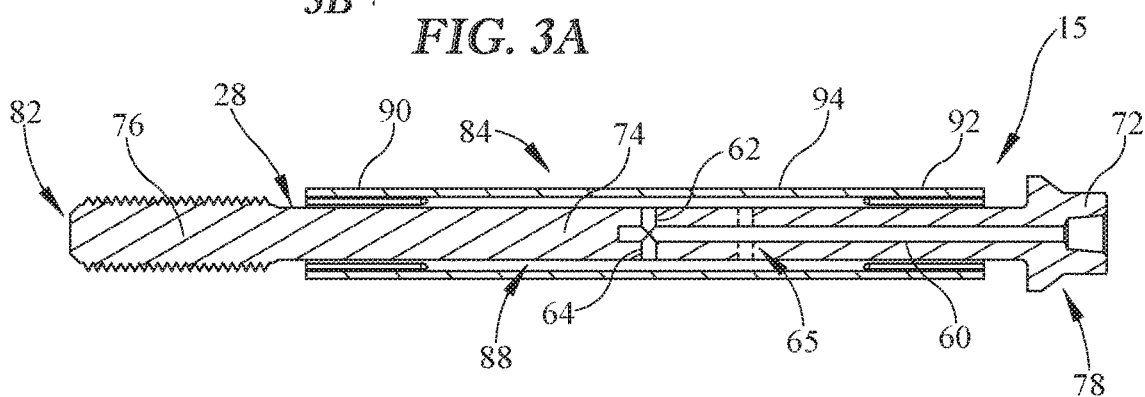
FIG. 4

ACTIVELY COOLED ENGINE ASSEMBLY WITH CERAMIC MATRIX COMPOSITE COMPONENTS

FIELD OF THE DISCLOSURE

The present disclosure relates generally to assemblies including ceramic matrix composite components, and more specifically to turbine shroud and other assemblies used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from ceramic matrix composite materials suitable for use in high temperature environments. Due to material properties of ceramic matrix composite materials, coupling such components to metallic parts of a shroud assembly can present challenges.

SUMMARY

The present disclosure may comprise one or more of the following features and combinations thereof.

In certain embodiments of the presently disclosed design, a turbine shroud is adapted to be mounted outward of blades included in a turbine wheel assembly and block gasses from passing over the blades without interacting with the blades. The turbine shroud may include a carrier segment and a blade track segment. The carrier segment may comprise metallic materials and may be configured to be mounted to other metallic components within the gas turbine engine. The blade track segment may comprise ceramic matrix composite materials.

In illustrative embodiments, the blade track segment may include a runner and an attachment feature. The runner extends partway around a central axis to face a primary gas path of the gas turbine engine. The attachment feature has an eyelet formed through it.

In illustrative embodiments, the turbine shroud may further include a mount assembly for coupling the blade track segment to the carrier segment. The mount assembly may include an attachment pin comprising metallic materials that extends through the eyelet in the attachment feature of the blade track segment. The mount assembly may also include a cooling-air distributor arranged in a hollow formed by the attachment pin. The cooling-air distributor may be configured to discharge cooling air within the attachment pin.

In illustrative embodiments, the cooling-air distributor is formed to include cooling air passages. The cooling passages may include a primary passage that extends from an end of the attachment pin along a length of the attachment pin, a first discharge passage that extends from the primary passage to an exterior surface of the attachment pin so as to discharge cooling air from the primary passage at a first location along the length of the attachment pin, and a second discharge passage that extends from the primary passage to an exterior surface of the attachment pin so as to discharge cooling air from the primary passage at a second location spaced from the first discharge passage.

In illustrative embodiments, the first discharge passage and the second discharge passage are collinear and circumferentially spaced from one another. The first discharge passage and the second discharge passage may be arranged about midway along the length of the attachment pin.

In illustrative embodiments, the cooling-air distributor may be formed to include a third discharge passage and a fourth discharge passage that extend from the primary passage to an exterior surface of the attachment pin. These passages allow for discharge of cooling air from the primary passage at third and fourth locations.

In illustrative embodiments, the third discharge passage and the fourth discharge passage are arranged at the same location along the length of the attachment pin as the first discharge passage and the second discharge passage. The third discharge passage and the fourth discharge passage may be collinear.

In illustrative embodiments, the first discharge passage and the second discharge passage may be spaced axially from one another along a length of the attachment pin.

In illustrative embodiments, the cooling-air distributor is a bolt. The bolt is formed to include a head at a first end arranged outside the eyelet, a shaft that extends from the head, and threads at a second end arranged outside the eyelet. The primary passage may extend from the head and into the shaft within the eyelet in the attachment feature of the blade track segment.

In illustrative embodiments, the attachment pin may be tubular and may be sized to define a space around the shaft of the bolt that is in fluid communication with the primary passageway via the first and second discharge passageways. The ends of the attachment pin may be formed to include slots configured to provide compliance of the mount assembly.

According to another aspect of the present disclosure, an assembly adapted for use in a gas turbine engine is disclosed. The assembly may include a carrier segment comprising metallic materials and a supported component comprising ceramic matrix composite materials. The supported component may include a heat shield and an attachment feature with an eyelet formed therethrough.

In illustrative embodiments, a mount assembly for coupling the supported component to the carrier segment may include an attachment pin. The attachment pin may comprise metallic materials and may extend through the eyelet in the attachment feature of the supported component.

In illustrative embodiments, the mount assembly may include a cooling-air distributor. The cooling-air distributor may be configured to discharge cooling air onto the attachment pin within the eyelet of the supported component.

In illustrative embodiments, the cooling-air distributor is formed to include a primary passage and discharge passages.

The primary passage extends from an end of the pin along a length of the attachment pin. A first discharge passage that extends from the primary passage to an exterior surface of the attachment pin. A second discharge passage that extends from the primary passage to an exterior surface of the attachment pin.

In illustrative embodiments, the first discharge passage and the second discharge passage may be arranged along a middle third of the length of the attachment pin. The first discharge passage and the second discharge passage may be collinear.

In illustrative embodiments, the cooling-air distributor may be formed to include a third discharge passage that extends from the primary passage to an exterior surface of the attachment pin and a fourth discharge passage that extends from the primary passage to an exterior surface of the attachment pin. The third discharge passage and the fourth discharge passage may be arranged at the same location along the length of the attachment pin as the first discharge passage and the second discharge passage. The third discharge passage and the fourth discharge passage may be collinear.

In illustrative embodiments, the attachment pin may be tubular and may be sized to define a space that receives the cooling-air distributor. The space may be coupled in fluid communication with the primary passageway via the first and second discharge passageways.

In illustrative embodiments, the ends of the attachment pin may be formed to include slots. The slots may extend along a portion of the length of the attachment pin.

In illustrative embodiments, the cooling-air distributor may be a bolt. The bolt may be formed to include a head at a first end arranged outside the eyelet, a shaft that extends from the head, and threads at a second end arranged outside the eyelet.

These and other features of the present disclosure will become more apparent from the following description of the illustrative embodiments.

BRIEF DESCRIPTION OF THE DRAWINGS

FIG. 3 is a detail view of a portion of FIG. 2 showing a turbine shroud segment that includes a carrier segment made from metallic materials, a blade track segment made from ceramic matrix composite materials, and an attachment pin that couples the turbine shroud segment to the carrier segment while being actively cooled by a bolt that provides a cooling-air distributor for discharging cooling air within the attachment pin;

FIG. 3A is an enlarged view of a portion of FIG. 3 showing that the bolt that provides the cooling-air distributor is formed to include a primary cooling passage extending axially through the bolt and a plurality of discharge passages extending from the primary passage to an exterior surface of the bolt so as to convey cooling air from the primary passage and through the discharge passages to cool the attachment pin;

FIG. 3B is a cross sectional view of the attachment pin and the bolt taken along section indicator 3B-3B from FIG. 3A showing that the plurality of discharge passages includes first, second, third, and fourth discharge passages;

FIG. 4 is a sectional view of the bolt from FIG. 3 showing that the bolt includes a head at a first end, threads at a second end, and a shaft between the head and the threads;

DETAILED DESCRIPTION OF THE DRAWINGS

Figure 1:
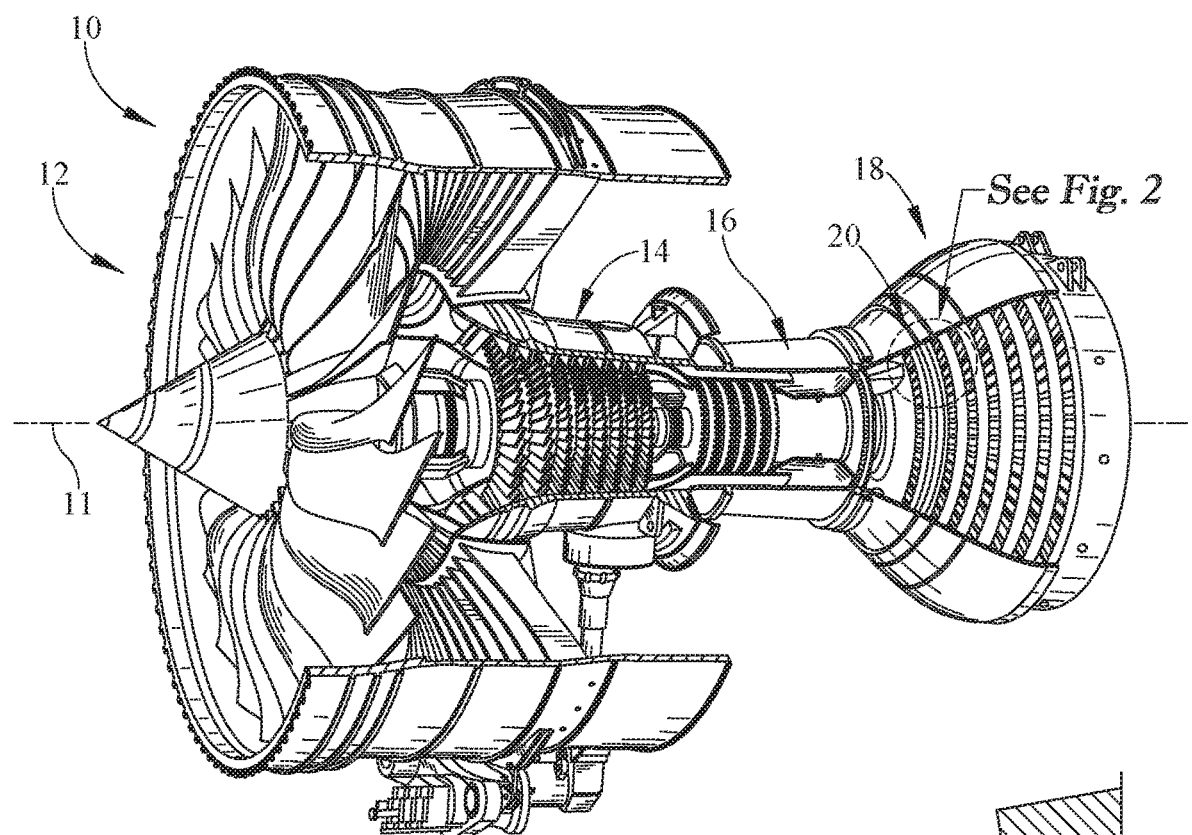
FIG. 1 is a cut-away perspective view of a gas turbine engine showing that the exemplary engine includes a fan driven by an engine core having a compressor, a combustor, and a turbine.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12.

Figure 2:
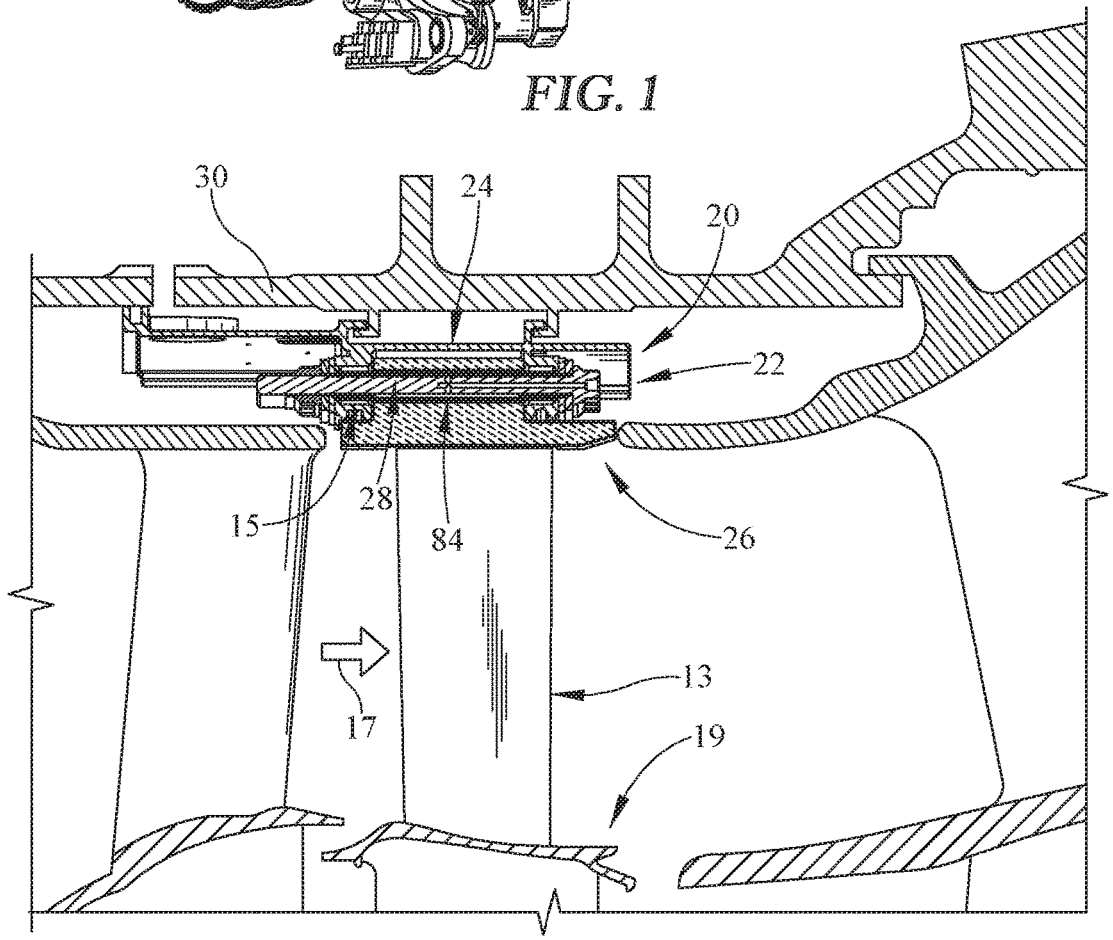
FIG. 2 is a partial cross-sectional view of the gas turbine engine of FIG. 1 showing the arrangement of a segmented turbine shroud radially outward of blades included in a turbine wheel assembly to suggest that the turbine shroud blocks gasses from passing over the blades without interacting with the blades.

The turbine 18 includes at least one turbine wheel assembly 19 and a turbine shroud 20 positioned to surround the turbine wheel assembly 19 as shown in FIGS. 1 and 2. The turbine shroud 20 is coupled to an outer case 30 of the gas turbine engine 10. The turbine wheel assembly 19 includes a plurality of blades 13 coupled to a rotor disk for rotation therewith. The hot, high pressure combustion products from the combustor 16 are directed toward the blades 13 of the turbine wheel assemblies 19 along a flow path 17. The blades 13 are in turn pushed by the combustion products to cause the turbine wheel assembly 19 to rotate; thereby, driving the rotating components of the compressor 14 and/or the fan 12.

The turbine shroud 20 extends around the turbine wheel assembly 19 to block combustion products from passing over the blades 13 without pushing the blades 13 to rotate as suggested in FIG. 2. In the illustrative embodiment, the turbine shroud 20 is made up of a number of shroud segments 22, one of which is shown in FIGS. 3 and 4, that extend only part-way around the central axis 11 and cooperate to surround the turbine wheel assembly 19. The shroud segments 22 are sealed against one another, such as by strip seal members, to provide a continuous turbine shroud 20. In certain embodiments, certain components of the turbine shroud 20 are segmented while other components are annular and non-segmented.

Each shroud segment 22 includes a carrier segment 24, a blade track segment 26, and a mount assembly 15 configured to couple the blade track segment 26 to the carrier segment 24 as shown in FIG. 2. The carrier segment 24 is a metallic support component configured to interface with other metallic components spaced from the primary gas path of the engine 10. The blade track segment 26 is a ceramic matrix composite component configured to directly face the high temperatures of the primary gas path. The mount assembly 15 includes attachment pins 84 and bolts 28 that provide cooling-air distributors configured to provide cooling air for the attachment pins 84 to extend the life of the attachment pins 84.

The carrier segment 24 included in each shroud segment 22 is coupled to an outer case 30 of the engine 10 as shown in FIG. 2. Each carrier segment 24 illustratively includes a body plate 32, hangers 34, and support flanges 35, 36 as shown in FIG. 3. The body plate 32 extends partway around the axis 11. The hangers 34 extend radially outward from the body plate 32 and engage the outer case 30 to couple the turbine shroud segment 22 to the rest of the engine 10. A forward support flange 35 extends radially inward from the body plate 32. An aft support flange 36 is spaced aft of the forward support flange 35 along the axis 11 and extends radially inward from the body plate 32. Each of the support flanges 35, 36 is formed to include a mount aperture 37 sized to receive forward/aft portions of the attachment pin 84 as shown in FIG. 3.

The blade tracks segment 26 of each shroud segment 22 comprises ceramic matrix composite materials as suggested in FIGS. 2 and 4. The blade track segment 26 is held in place adjacent to tips of turbine blades 13 to block combustion products from passing over the blades 13 without pushing the blades 13 to rotate as suggested in FIG. 2. The blade track segment 26 is illustratively formed to include a runner 40 and an attachment 42. The runner 40 arcuate and extends partway around axis 11 adjacent to turbine blades 13. The attachment 42 extends radially outward from the runner 40 to provide structure for coupling the blade track segment 26 to the carrier segment 24.

Figure 5:
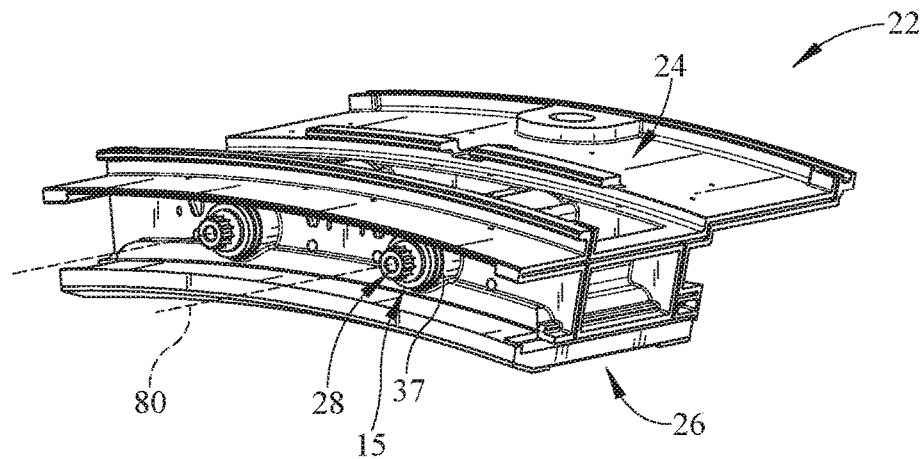
FIG. 5 is a perspective view of the turbine shroud segment of FIGS. 2 and 3.
Figure 6:
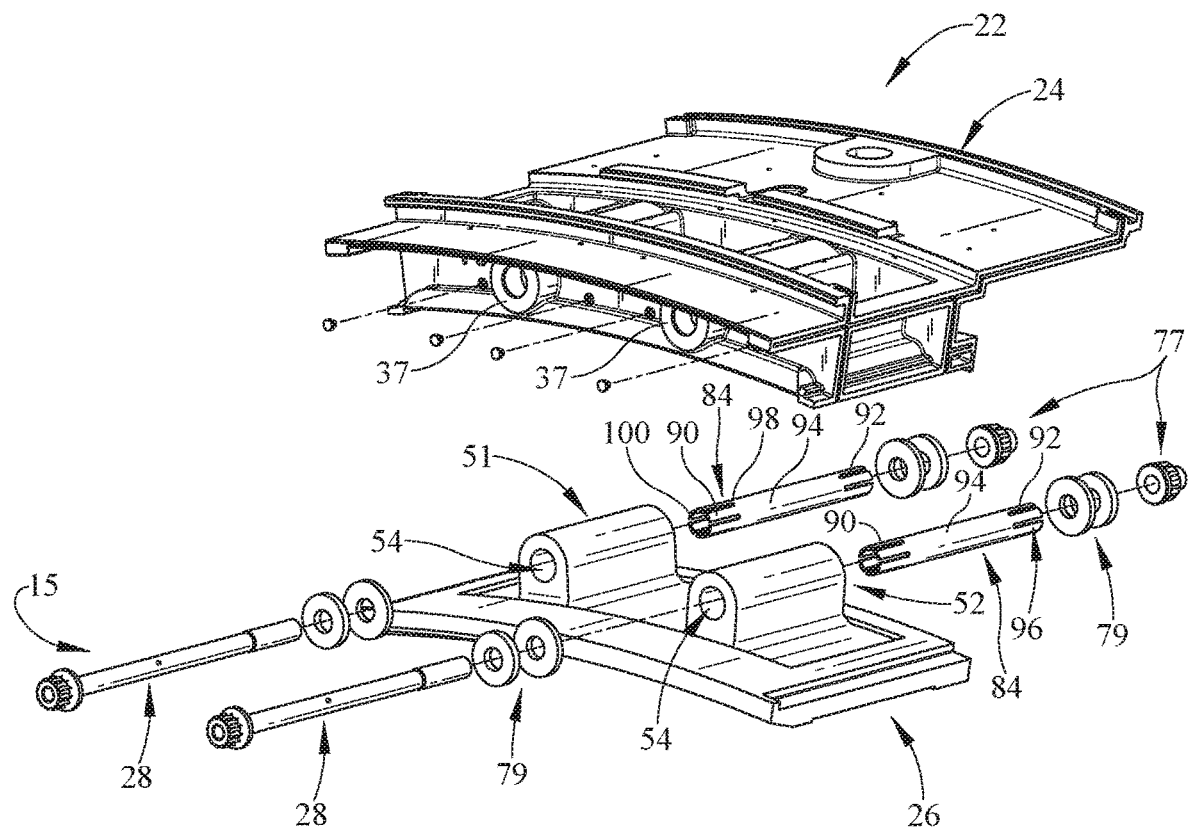
FIG. 6 is an exploded assembly view of the turbine shroud segment of FIG. 5.

In the illustrative embodiment, the attachment 42 of the blade track segment 26 includes two attachment features 51, 52 as shown in FIGS. 5 and 6. The attachment features 51, 52 are circumferentially spaced apart from one another and extend part-way across the runner 40 in the axial direction parallel to the central axis 11. Each attachment feature 51, 52 is formed to include an eyelet 54 sized to receive a respective attachment pin 84. When a segment 22 is assembled, the attachment features 51, 52 are located so that the eyelets 54 are aligned with mount apertures 37 of the support flanges 35, 36 included in the carrier segment 24. The attachment pins 84 are inserted through apertures 37 and eyelets 54 to couple the blade track segments 26 to the carrier segments 24.

Each attachment pin 84 is illustratively a round tubular member that extends around the bolts 28 inside the eyelet 54 as shown in FIGS. 3 and 4. The attachment pins 84 each define a central opening or hollow 86 that extends through the pin 84. The central opening 86 of the attachment pins 84 is sized to provide a cooling air space 88 between the bolt 28 and the attachment pin 84 as shown in FIG. 3A.

The attachment pin 84 includes a first end 90, a second end 92 spaced apart from the first end 90 and a body 94 between the first and second ends as shown in FIG. 4. Each end 90, 92 is formed to include slots 96 that provide compliance to the mount assembly 15. The slots 96 can also be configured to conduct cooling air from the space 88 out of the eyelet 54. In other embodiments in which the slots 96 are omitted, the air will flow out of the inner diameter of the pin 84 and through the gap between the outer diameter of pin 84 and the bore in the carrier 24 wall into the internal cavity between the carrier 24 and segment 26.

In the illustrative embodiment, the slots 96 have an inlet 98 adjacent to the body 94. The slots extend from the inlet 98 through a tip 100 of each end 90, 92. However, in other embodiments, the slots may not extend all the way to the tip 100 of each end 90, 92. In still other embodiments, the attachment pin 84 may include cross holes instead of slots. The cross holes may be placed at the same axial location as the gap between the end of the segment lugs and the carrier walls, then the cross-holes would allow egress of the cooling flow while also increasing compliance of the attachment system.

The bolts 28 are formed to include one or more cooling air passages to provide cooling-air distributors for the attachment pins 84 as suggested in FIGS. 3-4. A primary passage 60 extends from an end of the attachment pin 84 along a length of the bolt 28. First and second discharge passages 62, 64 extend from the primary passage 60 to an exterior surface 66 of the bolt 28 so as to discharge cooling air 61 from the primary passage 60 at first and second locations in the attachment pin 84. The first and second discharge passages 62, 64 are arranged generally perpendicular to the bolt 28 and are collinear. As such, if either of the first and second discharge passages 62, 64 are blocked, cooling air may still exit through the other of the discharge passages.

The bolt 28 may be formed to include a third discharge passage 68 and a fourth discharge passage 70 as shown in FIG. 3B. The third and fourth discharge passages 68, 70 are collinear and are arranged generally perpendicular to the bolt 28 and the primary passage 60. The third and fourth discharge passages 68, 70 are configured to discharge cooling air from the primary passage 60 at third and fourth locations in the eyelet 54. As such, if any of the first, second, third, or fourth discharge passages 62, 64, 68, 70 are blocked, cooling air may still exit through at least one of the other discharge passages 62, 64, 68, 70.

In the illustrative embodiment, the first and second discharge passages 60, 62 are arranged generally perpendicular to the third and fourth discharge passages 68, 70 as shown in FIG. 3B. However, in other embodiments, the first and second discharge passages 60, 62 may not be generally perpendicular to the third and fourth discharge passages 68, 70. Additionally, each of the discharge passages 62, 64, 68, 70 are coplanar with one another. However, in other embodiments, the discharge passages may not be coplanar and may include multiple sets of passages 65 along the length of the bolt 28 as suggested in FIG. 4. The passages 60, 62, 64, 65, 68, 70 may be machined in the bolt 28 by electrical discharge machining (EDM) processes. However, any suitable method may be used to form the passages in the bolt 28.

Each bolt 28 illustratively includes a head 72, a shaft 74, and a thread 76 as shown in FIG. 4. The head 72 is coupled at a first end 78 of the bolt 28 and is arranged outside of the eyelet 54 as shown in FIG. 5. The shaft 74 extends along an axis 80 through forward/aft support apertures 37 and eyelet 54. The thread 76 is coupled at a second end 82 of the bolt 28 and is arranged outside of the eyelet 54. A nut 77 engages the thread 76 to block movement of the bolt 28 away from the eyelet 54.

One or more washers 79 may be included between the nut 77 and the attachment features 51, 52 and between the head 72 and the attachment features 51, 52. One of the washers 79 can be a high temperature gasket to improve sealing at this interface. Possible high temperature gasket materials could be thermiculite, micaboard, or Ox-Ox CMC. Gasket material could be bare or metallic foil wrapped for durability.

Illustratively, the primary passage 60 extends from the head 72 of the bolt 28 through the shaft 74. In another embodiment, the primary passage 60 extends from the thread 76 of the bolt 28 through the shaft 74. The discharge passages 62, 64, 68, 70 extend outwardly from the primary passage 60 about midway along a length of the bolt 28. In another example, the discharge passages are arranged along a middle third of the length of the attachment pin. By locating the passages near the middle of the attachment pin 84, cooling air can flow in both directions along the attachment pin 84 scrubbing temperature from the inner diameter of the attachment pin 84. However, the discharge passages 62, 64, 68, 70 may extend outwardly from the primary passage 60 at any location along the length of the bolt 28.

The shaft 74 is illustratively made from metallic material and is integrally formed as a one-piece component as shown in FIG. 4. The shaft 74 illustratively has a round, tubular cross-sectional shape but in other embodiments may have a different cross-sectional shape (rectangular, oval, etc.) and may be solid. While the illustrative embodiment of FIG. 4 shows the shaft 74 as being a reduced diameter from the major diameter of the thread 76, the shaft 74 diameter could be the same diameter as the major diameter of the thread or it could be larger in diameter than the major diameter of the thread 74.

In illustrative embodiments, a large pin attachment strategy may be a metallic pin inserted into a CMC segment. The pin retaining the CMC segment may be subject to both conductive and radiative heating that may push the metallic pin into temperature regimes where creep lives may become shorter. In order to manage the pin temperatures, mount assembly 15 described herein provides a strategy for introducing cooling air into the inside of the pin 84 via a hole 60 down the axis 80 of the bolt 28 that meets with a cross hole 62, 64 approximately midway along the length of the pin.

In illustrative embodiments, cooling air may wash axially down the length of the hole 60 in the pin 84 in both axial directions. This cooling air may then dump into the interior cavity 88 of the pin 84. In one example, the cooling air flow provides a 150 degree Fahrenheit difference in pin temperatures when compared to a pin 84 without cooling.

In illustrative embodiments, two diametrically opposed cross-holes formed in the bolt 28 may be provided for air to enter the clearance between the pin 84 and the bolt 28. This is because the pin 84 may be positioned such that one side is in contact with the cross holes 62, 64 of the bolt 28. If one of the holes happens to lie precisely where the pin contacts the bolt, the hole may be blocked and there may be no cooling flow. But, by including diametrically opposed holes 62, 64, at least one hole may always be open to the clearance.

In illustrative embodiments, the central hole 60 begins at the head 72 of the bolt 28. In other embodiments, the hole 60 could also begin at the threaded end 76 of the bolt 28 and pass through the middle of the threads. By extending through the head 72 of the bolt, a larger hole 60 or larger tolerances may be used to improve manufacturability.

FIGS. 2 and 3 show an illustrative embodiment with the coolant flow coming from an area aft of the segment carrier 24, through the central hole 60, to the pin clearance area 88. An alternate arrangement may be to turn the bolt around (180 degrees) or use the alternate embodiment described above (coolant hole beginning in thread 76) to use compressor discharge air from an area forward of the segment carrier 24. This may be desired if there is inadequate pressure to drive adequate flow through the cooling circuit 60, 62, 64.

In illustrative embodiments, multiple sets of diametrically opposite holes 65 may be located at different locations along the length of the bolt 28. This may increase cooling flow without increasing the hole sizes since the bolts are expected to be limited in size.

Mount assemblies in accordance with the present disclosure may be used in other gas turbine engine assemblies in which active cooling of attachment pins is desired. In one example, ceramic matrix composite combustor liner components may be coupled to metallic combustor shells using the mount assembly described herein. In another example, exhaust gas heat shields comprising ceramic matrix composites may be coupled to metallic components using the disclosed mount assembly. Accordingly, a number of different supported components may be coupled to metallic carrier components via the described mount assembly.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud adapted to be mounted outward of blades included in a turbine wheel assembly and block gasses from passing over the blades without interacting with the blades, the turbine shroud comprising
 a carrier segment comprising metallic materials and configured to be mounted to other metallic components within the gas turbine engine,
 a blade track segment comprising ceramic matrix composite materials, the blade track segment including a runner that extends partway around a central axis to face a primary gas path of the gas turbine engine and an attachment feature with an eyelet formed therethrough, and
 a mount assembly including an attachment pin comprising metallic materials that extends through the eyelet in the attachment feature of the blade track segment that couples the blade track segment to the carrier segment and a cooling-air distributor arranged in a hollow formed by the attachment pin and configured to discharge cooling air within the attachment pin,
 wherein the cooling-air distributor is formed to include cooling air passages including a primary passage that extends from an end of the attachment pin along a length of the attachment pin, a first discharge passage that extends from the primary passage to an exterior surface of the attachment pin so as to discharge cooling air from the primary passage at a first location along the length of the attachment pin, and a second discharge passage that extends from the primary passage to an exterior surface of the attachment pin so as to discharge cooling air from the primary passage at a second location spaced from the first discharge passage.

2. The turbine shroud of claim 1, wherein the first discharge passage and the second discharge passage are collinear and circumferentially spaced from one another.

3. The turbine shroud of claim 2, wherein the first discharge passage and the second discharge passage are arranged about midway along the length of the attachment pin.

4. The turbine shroud of claim 2, wherein the cooling-air distributor is formed to include a third discharge passage that extends from the primary passage to an exterior surface of the attachment pin so as to discharge cooling air from the primary passage at a third location and a fourth discharge passage that extends from the primary passage to an exterior surface of the attachment pin so as to discharge cooling air from the primary passage at a fourth location.

5. The turbine shroud of claim 4, wherein the third discharge passage and the fourth discharge passage are arranged at the same location along the length of the attachment pin as the first discharge passage and the second discharge passage.

6. The turbine shroud of claim 4, wherein the third discharge passage and the fourth discharge passage are collinear.

7. The turbine shroud of claim 1, wherein the first discharge passage and the second discharge passage are spaced axially from one another along a length of the attachment pin.

8. The turbine shroud of claim 1, wherein the cooling-air distributor is a bolt formed to include a head at a first end arranged outside the eyelet, a shaft that extends from the head, and threads at a second end arranged outside the eyelet.

9. The turbine shroud of claim 8, wherein the primary passage extends from the head and into the shaft within the eyelet in the attachment feature of the blade track segment.

10. The turbine shroud of claim 8, the attachment pin is tubular and is sized to define a space around the shaft that is in fluid communication with the primary passageway via the first and second discharge passageways.

11. The turbine shroud of claim 10, wherein the ends of the attachment pin are formed to include slots configured to provide compliance of the mount assembly.

12. An assembly adapted for use in a gas turbine engine, the assembly comprising
a carrier segment comprising metallic materials,
a supported component comprising ceramic matrix composite materials, the supported component including a heat shield and an attachment feature with an eyelet formed therethrough, and
a mount assembly including an attachment pin comprising metallic materials that extends through the eyelet in the attachment feature of the supported component and a cooling-air distributor configured to discharge cooling air onto the attachment pin within the eyelet of the supported component,
wherein the cooling-air distributor is formed to include a primary passage that extends from an end of the pin along a length of the attachment pin, a first discharge passage that extends from the primary passage to an exterior surface of the attachment pin, and a second discharge passage that extends from the primary passage to an exterior surface of the attachment pin.

13. The turbine shroud of claim 12, wherein the first discharge passage and the second discharge passage are arranged along a middle third of the length of the attachment pin.

14. The turbine shroud of claim 13, wherein the first discharge passage and the second discharge passage are collinear.

15. The turbine shroud of claim 12, wherein the cooling-air distributor is formed to include a third discharge passage that extends from the primary passage to an exterior surface of the attachment pin and a fourth discharge passage that extends from the primary passage to an exterior surface of the attachment pin.

16. The turbine shroud of claim 15, wherein the third discharge passage and the fourth discharge passage are arranged at the same location along the length of the attachment pin as the first discharge passage and the second discharge passage.

17. The turbine shroud of claim 15, wherein the third discharge passage and the fourth discharge passage are collinear.

18. The turbine shroud of claim 12, the attachment pin is tubular and sized to define a space that receives the cooling-air distributor and is in fluid communication with the primary passageway via the first and second discharge passageways.

19. The turbine shroud of claim 12, wherein the ends of the attachment pin are formed to include slots extending along a portion of the length of the attachment pin.

20. The turbine shroud of claim 12, wherein the cooling-air distributor is a bolt formed to include a head at a first end arranged outside the eyelet, a shaft that extends from the head, and threads at a second end arranged outside the eyelet.

* * * * *